Patented Sept. 1, 1953

2,650,908

UNITED STATES PATENT OFFICE 2,650,908

VINYL CHLORIDE POLYMER PLASTICIZED WITH 3,5,5 - TRIMETHYL - 1 - HEXANOL-POLYBASIC ACID ESTER

Warren L. Beears, Cleveland, Ohio, assignor to The B. F. Goodrich Company, New York, N. Y., a corporation of New York No Drawing. Original application April 8, 1948, Serial No. 19,897. Divided and this application March 13, 1951, Serial No. 215,389

6 Claims. (Cl. 260—30.6)

This invention relates to plasticized resin compositions and pertains more particularly to compositions comprising a polymer of vinyl chloride plasticized with an ester of 3,5,5-trimethyl hexanol with polybasic acids.

To be useful as a plasticizer, it is desirable that a compound have certain properties. These properties include: compatability with the material to be plasticized; little or no flammability; clarity and almost complete lack of color; almost complete lack of odor and taste; resistance to light, water, chemicals and oils; stability to atmospheric conditions; reluctance to crystallize or separate from materials with which it is incorporated; high melting point and non-volatility; ability to decrease viscosity of materials with which it is incorporated and to impart ductility and tenacity thereto; non-conductivity of electricity; compatability with fillers, dyes and pigments; ability to produce highly elastic, non-shrinking and non-scratchable surface; flexibility at high and low temperatures; and stability on aging.

I have now discovered that esters of 3,5,5-trimethyl hexanol with polybasic acids exhibit the above properties to a remarkable degree and possess electrical resistivity and resistance to water which are outstandingly superior to that of other esters of straight or branched chain higher alcohols such as n-octanol and 2-ethyl hexanol.

The esters of 3,5,5-trimethyl hexanol which are utilized as plasticizers in the compositions of this invention are highly branched and are characterized in that each alcohol residue therein contains a neopentyl

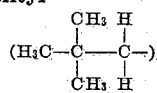

grouping, derived from the 3,5,5-trimethyl hexanol,

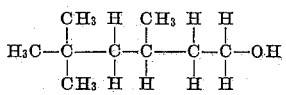

For example, the ester of this alcohol with phthalic acid contains two neopentyl groups and has the formula

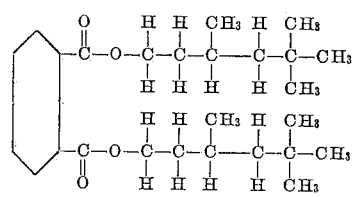

Similarly, the ester of 3,5,5-trimethyl hexanol with adipic acid contains two neopentyl groups and has the formula

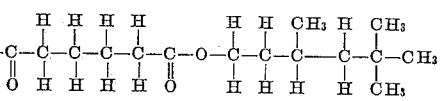

The ester of 3,5,5-trimethyl hexanol with a tribasic acid contains three neopentyl groups. For example, the ester with phosphoric acid has the formula

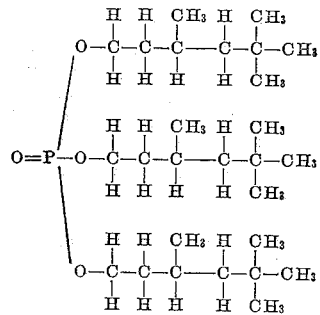

It is believed that the remarkable difference in properties between the esters of 3,5,5-trimethyl hexanol and esters of other aliphatic alcohols is due to the presence of the neopentyl groups, although this has not been established with certainty.

The polybasic acid with which the 3,5,5-trimethyl hexanol is esterified may be either inorganic or organic, aliphatic or aromatic. For example, inorganic acids such as boric acid, phosphoric acid, carbonic acid and the like may be used as may organic polybasic acids including aliphatic polycarboxylic acids such as oxalic acid, malonic acid, succinic acid, glutaric acid, adipic acid, pimelic acid, suberic acid, azelaic acid, brassylic acid, thapsic acid, maleic acid, fumaric acid, glutaconic acid, alpha-butyl-alpha-ethyl glutaric acid, alpha-beta-diethyl succinic acid, 1,1,5-pentanetricarboxylic acid, 1,2,4-hexanetricarboxylic acid, 1,2,4-butanetricarboxylic acid; and aromatic polycarboxylic acids such as phthalic acid, isophthalic acid, terephthalic acid, hemimellitic acid, trimellitic acid, trimesic acid, mellophanic acid, pyromellitic acid, benzenepentacarboxylic acid, naphthalic acid and the like.

The esters described hereinabove may be prepared by reacting the polybasic acids, or the corresponding acid anhydrides or chlorides, with 3,5,5-trimethyl hexanol, or by reacting sodium salts of the acids with chlorides or other halide esters of the alcohol under suitable conditions.

When reacting the alcohol with the acid or its anhydride or chloride, it is desirable that a molar excess of the alcohol be used and preferably a ratio of 3 moles of the alcohol to one mole of the acid is used, although the alcohol-acid ratio may be as high as 10:1 or higher and as low as 1:1 or even lower.

The reaction temperature is not critical and may be varied widely depending on the particular ester being prepared. For example, in preparing the phthalate ester a temperature of from 200° to 240° C. has been found to be optimum. In preparing the phosphate ester the preferred temperature range is approximately 25° to 50° C. In general, esters of 3,5,5-trimethyl hexanol may be prepared at temperatures of from 20° C. or lower to 300° C. or even higher with good results. The reaction is conducted by adding the anhydride, acid or acid halide to the 3,5,5-trimethyl hexanol which has been cooled to low temperatures, preferably below 15° C. After the addition is complete, the mixture is brought to the reaction temperature. As the reaction proceeds, monoester is formed which is undesirable from the standpoint that it tends to decompose a part of the polyester and thus decrease the yield of the desired product. Furthermore, due to the carboxyl groups of the monoester present, the acidity of the reaction product is high, resulting in an impure product. It is important, therefore, that the monoester be separated from the reaction mixture or converted to a form in which it has no harmful effect on the reaction. Separation of the monoester may be accomplished by high temperature, high vacuum distillation. A second method involves the addition of sufficient base to neutralize ⅓ of the carboxyl groups present, after which the product is distilled to recover the pure ester of 3,5,5-trimethyl hexanol.

The preferred method consists in adding a finely-divided ion-exchange resin such as one of the products known commercially as "Amberlite" to the reaction mixture to remove undesirable monoester. The mixture is then washed with an organic solvent to remove the resin-monoester combination. The desired ester is recovered by distilling off the solvent preferably at reduced pressures.

The following examples will serve to illustrate the preparation of esters of 3,5,5-trimethyl hexanol. There are, of course, many variations and modifications in the procedure which will be apparent to those skilled in the art. All parts are by weight.

EXAMPLE I 35.2 parts (.238 mole) of phthalic anhydride are added slowly to 100 parts (.694 mole) of 3,5,5-trimethyl hexanol in a glass reaction vessel fitted with an esterification head. After the addition is complete the temperature is raised to 200° C. to 240° C. for a period of six hours. The excess alcohol is then removed by distillation at a pressure of 20 mm. and a temperature of 90° C. The temperature is then raised and phthalic anhydride removed at from 135 to 190° C. There are obtained 87.5 parts of di-(3,5,5-trimethyl hexyl) phthalate (B. P. 170° C./.2 mm., $N_D^{25}$ 1.4819, Sp. $G._D^{25}$ 0.9655, viscosity 105.5 cp. at 22° C., vapor pressure 800 microns at 220° C.).

EXAMPLE II 117 parts of phthalic anhydride are added to 390 parts of 3,5,5-trimethyl hexanol in a glass-lined reactor equipped with an agitator and a glass-lined column which contains ceramic packing. 231 parts of benzene are added to cause initial circulation and the reaction mixture is heated, with 140 p. s. i. of steam on the reactor jacket, the reaction mixture being agitated constantly. As the benzene boils it entrains from 20 to 30% by volume of the alcohol. At the same time water formed by the reaction passes with the alcohol-benzene mixture through the condenser into a decanter where the water separates from the alcohol-benzene mixture and collects at the bottom of the decanter. The alcohol-benzene is returned to the reaction mixture, the recirculation rate of the alcohol-benzene mixture being maintained throughout the reaction by the addition of benzene to maintain a constant boiling rate as the amount of unreacted alcohol decreases. The benzene is then removed by straight distillation. The excess alcohol is removed by steam distillation. Superheated steam is passed into the bottom of the reactor at a rate sufficient to maintain a pressure difference of about 2 p. s. i. from the reactor to the top of the column. When all excess alcohol is removed the rate of the stripping steam is increased to maintain a pressure difference of about 3 p. s. i. from the reactor to the top of the column. The stripping is continued in this manner until the acid number of the product reaches a minimum value. 274 parts (90.8%) of di-(3,5,5-trimethyl hexyl) phthalate (B. P. 170°–175° C./2 mm.) are obtained.

EXAMPLE III 76.7 parts (0.5 mole) of phosphorus oxychloride (B. P. 104° C./760 mm.) are added over a period of 50 minutes to 592 parts (4 moles) of 3,5,5-trimethyl hexanol which is maintained at 11° C. during the addition period. The reaction mixture is allowed to warm to room temperature and is then heated for 2½ hours at a temperature of from 25° to 50° C. The excess alcohol is then removed by vacuum distillation at a pressure of 30 mm. and a temperature of 100° C. and the residue is treated with 50% aqueous solution of sodium hydroxide to neutralize the acid formed in the reaction. The product is then distilled at a pressure from .25 mm. to 1 mm. and a temperature of 94° to 168° C. 151 parts (60%) of tri-(3,5,5-trimethyl hexyl) phosphate (165°–170° C./.25 mm.) are obtained.

EXAMPLE IV 153.4 parts (1 mole) of phosphorus oxychloride are added over a period of 50 minutes to 1152 parts (8 moles) of 3,5,5-trimethyl hexanol which has been cooled to 2° C. The reaction mixture is then heated at a pressure of 25 mm. and a temperature of 50° C. for a period of 24 hours. The excess alcohol is then removed by distillation at 150° C. and 1 mm. pressure. The residue is treated with 125 parts of Amberlite IR-4 resin and 125 parts of water to remove acidity present. The ion exchange resin is removed by filtering and the filtrate washed with hexane after which the hexane layer is separated from the ester at reduced pressures. 372 parts (74%) of tri-(3,5,5-trimethyl hexyl) phosphate (B. P. 165°–170° C./.25 mm.)

Similarly, other esters of 3,5,5-trimethyl hexanol are prepared by the above methods. For example, di-(3,5,5-trimethyl hexyl) succinate is prepared by reacting succinic anhydride with 3,5,5-trimethyl hexanol, and 1,2,4-tri-(3,5,5,-trimethyl hexyl) adipate is prepared by reacting 1,2,4-butane tricarboxylic acid with 3,5,5-trimethyl hexanol.

As disclosed hereinabove, the esters of 3,5,5-trimethyl hexanol are excellent plasticizers for rubbers, synthetic resins and especially for polyvinyl chloride and similar vinyl resins.

Vinyl resins similar to polyvinyl chloride include polyvinyl bromide and copolymers of vinyl chloride or bromide with one or more other polymerizable unsaturated compounds containing a single olefinic double bond such as vinyl acetate, vinylidene chloride, vinylidene bromide, styrene, acrylonitrile, methyl acrylate, ethyl acrylate, methyl chloroacrylate, ethyl cyanoacrylate, methyl methacrylate, diethyl fumarate, diethyl chloromaleate, isobutyl crotonate, vinyl isobutyl ether, vinyl methyl ketone, vinyl benzoate, vinyl butyrate, vinyl furane, vinyl pyridine, dichlorostyrene, isobutylene, ethylene and the like. All such polymeric materials are polymers of vinyl halides and are effectively plasticized by the esters of 3,5,5-trimethyl hexanol.

To illustrate the excellent properties of materials plasticized with esters of 3,5,5-trimethyl hexanol, polyvinyl chloride stocks are prepared by admixing 30 parts of powdered polyvinyl chloride and 20 parts of di-(3,5,5-trimethyl hexyl) phthalate in a container to form a dough-like mix. The resin plasticizer mix is then placed on a two-roll mixing mill and the temperature of the mill gradually raised. When the temperature of the mill reaches 240° F. the plasticizer adds to the resin and, after a few minutes milling, a clear continuous homogeneous sheet of plasticized resin is obtained. The sheet may be cut without tearing a ragged edge and is free from "nerve," that is, it does not shrink when a section is cut, these qualities indicating that the plasticizer is extremely compatible with the resin and that stocks plasticized with di-(3,5,5-trimethyl hexyl) phthalate may be processed easily at temperatures as low as 240° F. The sheet is then removed from the mill and allowed to cool to room temperature, whereupon it is quite soft and flexible and does not feel greasy to the touch (which indicates that plasticizer has not "bled" from the resin) even after standing in air for a period of two weeks.

A portion of the sheet thus obtained is molded in a hot cavity for three minutes at 320° F. to obtain molded samples approximately 0.075 inch thick. One such sample is exposed to ultraviolet light for 48 hours and is found to be substantially unchanged, there being no oxidation of the plasticizer or discoloration of the sample after this treatment. Another sample is placed in a circulating air oven for 4 days at 105° C. after which it is still flexible and its loss in weight determined to be no more than 4.8% based on the stock and no more than 12.03% based on the plasticizer. A third sample was extracted with water for 16 hours and has a water extraction of only .01%. Still other samples are tested for tensile strength, elongation, resistance to tear and in each case it is found that the composition is superior to polyvinyl chloride compositions containing the same percentage of di-2-ethylhexyl phthalate, one of the best known plasticizers for polyvinyl chloride.

A composition containing the same percentage of di-2-ethylhexyl phthalate prepared in the same way, however, requires a milling temperature of 250° to 260° F. before forming a homogeneous sheet, its heat loss in the 105° C. oven after four days is 10% based on the stock and 24% based on the plasticizer and it has a water of extraction of 1.5%.

Furthermore, the electrical resistivity of materials plasticized with the esters of 3,5,5-trimethyl hexanol are markedly superior to those plasticized with other well-known plasticizers. To illustrate this superiority, two stocks are prepared according to the following recipe:

|  | Parts | |
| --- | --- | --- |
|  | A | B |
| Polyvinyl chloride | 48 | 48 |
| Di-2-ethylhexyl phthalate | 25 |  |
| Di-(3,5,5-trimethyl hexyl) phthalate |  | 25 |
| Basic lead carbonate | 4.8 | 4.8 |
| Clay | 3.36 | 3.36 |
| Carbon black | .48 | .48 |

The electrical resistivity of the stocks thus prepared is measured by American Society for Testing Materials test D257-45, modified to the extent that an electronic amplifier is used to increase the galvanometer sensitivity. The resistivity is measured on an unaged sample and on samples aged for increasing periods of time at 130° C. Results on both the stock plasticized with di-(3,5,5-trimethyl hexyl) phthalate and that plasticized with di-n-octyl phthalate are tabulated below:

*Resistivity in ohm-cm.* $\times 10^9$

| Days Aged at 130° C. | Stock Plasticized with Di-2-ethylhexyl Phthalate | Stock plasticized with Di-(3,5,5-trimethyl hexyl) Phthalate |
| --- | --- | --- |
| 0 | 12,020 | 17,100 |
| 1 | 8,600 | 98,260 |
| 3 | 2,570 | 12,350 |
| 7 | 1,592 | 4,480 |
| 10 | 1,080 | 3,150 |

The following table gives the electrical resistivity when the above recipe is compounded without the carbon black:

| Days Aged at 130° C. | Stock Plasticized with Di-2-ethylhexyl Phthalate | Stock plasticized with Di-(3,5,5-trimethyl hexyl) Phthalate |
| --- | --- | --- |
| 1 | 523 | 8,790 |
| 3 | 340 | 1,150 |
| 7 | 300 | 610 |
| 10 | 250 | 410 |

The marked superiority in electrical properties of the esters of 3,5,5-trimethyl hexanol over other well-known plasticizers is apparent from the above tables. Of special significance is the improved resistivity of the unaged sample, the phenomenal increase in resistivity of the sample after being aged 1 day, and the fact that the resistivity remains remarkably higher than that of the stock plasticized with di-2-ethylhexyl phthalate. Thus, it can be seen that esters of 3,5,5-trimethyl hexanol are of great value in preparing compositions for insulating wires which carry an electric current, especially in D. C. communications equipment, and in other applications where high electric resistivity is an important factor.

Furthermore, since the compositions plasticized with the esters of 3,5,5-trimethyl hexanol possess excellent processing properties, extremely low heat loss, and resistance to water, such compositions will remain flexible for long periods of time even though subjected to elevated temperatures and all types of weather, and are accordingly very useful as jacket or sheathing compositions, molded compositions, and the like.

While specific embodiments of the invention have been disclosed herein, it is not intended to limit the invention solely thereto, for it is obvious that many modifications including substituting equivalent materials and varying the proportions of materials used are within the spirit and scope of the invention as defined in the appended claims.

This application is a division of my copending application Serial No. 19,897, filed April 8, 1948 now abandoned.

I claim:
1. A composition of matter comprising a polymer of vinyl chloride, and, as a plasticizer therefor, an ester of 3,5,5-trimethyl-1-hexanol with a polybasic acid selected from the class consisting of boric acid, phosphoric acid, carbonic acid and organic polycarboxylic acids.
2. A composition of matter comprising a polymer of vinyl chloride, and, as a plasticizer therefor, an ester of 3,5,5-trimethyl-1-hexanol with an organic polycarboxylic acid.
3. A composition of matter comprising a polymer of vinyl chloride, and, as a plasticizer therefor, an ester of 3,5,5-trimethyl-1-hexanol with an organic aromatic dicarboxylic acid.
4. A composition of matter comprising a polymer of vinyl chloride, and, as a plasticizer therefor, an ester of 3,5,5-trimethyl-1-hexanol with an organic aliphatic dicarboxylic acid.
5. A composition of matter comprising polyvinyl chloride, and, as a plasticizer therefor, di-(3,5,5-trimethyl hexyl) phthalate.
6. A composition of matter comprising polyvinyl chloride, and, as a plasticizer therefor, tri-(3,5,5-trimethyl hexyl) phosphate.

WARREN L. BEEARS.

References Cited in the file of this patent
UNITED STATES PATENTS

| Number | Name | Date |
|---|---|---|
| 2,464,784 | Easton | Mar. 22, 1949 |